(12) United States Patent
Lee

(10) Patent No.: US 10,820,571 B2
(45) Date of Patent: Nov. 3, 2020

(54) SELF-FEEDER FOR SOWS

(71) Applicant: Comax Livestock Technology (Jiangsu) Co., Ltd., Jiangsu (CN)

(72) Inventor: Gangpu Lee, Jiangsu (CN)

(73) Assignee: Comax Livestock Technology (Jiangsu) Co., Ltd., Jiangsu (CN)

(*) Notice: Subject to any disclaimer, the term of this patent is extended or adjusted under 35 U.S.C. 154(b) by 339 days.

(21) Appl. No.: 15/775,839

(22) PCT Filed: Feb. 21, 2017

(86) PCT No.: PCT/CN2017/074188
§ 371 (c)(1),
(2) Date: May 14, 2018

(87) PCT Pub. No.: WO2018/098907
PCT Pub. Date: Jun. 7, 2018

(65) Prior Publication Data
US 2020/0296923 A1    Sep. 24, 2020

(30) Foreign Application Priority Data

Dec. 2, 2016 (CN) .......................... 2016 1 1092573

(51) Int. Cl.
*A01K 5/02* (2006.01)
(52) U.S. Cl.
CPC .......... *A01K 5/0233* (2013.01); *A01K 5/0275* (2013.01)
(58) Field of Classification Search
CPC .. A01K 5/0225; A01K 5/0233; A01K 5/0275; A01K 5/0107
See application file for complete search history.

(56) References Cited

U.S. PATENT DOCUMENTS

| 3,053,228 | A | * | 9/1962 | Singley | A01K 5/0225 |
| | | | | | 119/52.4 |
| 3,073,487 | A | * | 1/1963 | Letson | A01K 5/0275 |
| | | | | | 222/282 |
| 3,193,155 | A | * | 7/1965 | Gretzolon | G11C 11/44 |
| | | | | | 222/227 |
| 3,515,098 | A | * | 6/1970 | Thurmond | A01K 5/0233 |
| | | | | | 119/51.01 |

(Continued)

FOREIGN PATENT DOCUMENTS

DE    1507076 A1 * 4/1969 .......... A01K 5/0233

*Primary Examiner* — Magdalena Topolski
*Assistant Examiner* — Shada Mohamed Alghailani
(74) *Attorney, Agent, or Firm* — JCIPRNET

(57) ABSTRACT

A self-feeder for sows, which includes a hopper, a feed volume adjusting mechanism, and a discharge mechanism. The hopper includes a C-shaped housing, a front side plate, a bottom plate, and a guide plate. A gap is disposed between the bottom plate and the front side plate and used as a discharge port. The discharge mechanism includes a discharge plate, a push rod, a top cap, and a stop pin. An upper end of the push rod passes through the bottom plate and the guide plate and is welded to the discharge plate. The self-feeder has a simple structure; the feed volume can be adjusted freely, and fodder can be discharged avoiding falling on the eyes and snout of a sow; the manual discharging times is reduced; the sow can eat fresh fodder and the fodder may not get out; therefore, the fodder is not wasted and manpower is saved.

3 Claims, 8 Drawing Sheets

(56) References Cited

U.S. PATENT DOCUMENTS

| | | | | |
|---|---|---|---|---|
| 3,780,701 A * | 12/1973 | Wentworth, Sr. | A01K 5/0233 | 119/51.01 |
| 4,235,200 A * | 11/1980 | Shay | A01K 5/0233 | 119/51.11 |
| 4,270,489 A * | 6/1981 | Joronen | A01K 61/85 | 119/51.04 |
| 4,829,935 A * | 5/1989 | Gray | A01K 5/0233 | 119/54 |
| 4,945,859 A * | 8/1990 | Churchwell | A01K 5/0275 | 119/54 |
| 4,982,698 A * | 1/1991 | Sollars | A01K 5/0233 | 119/54 |
| 5,351,649 A * | 10/1994 | Rovira Badia | A01K 5/0225 | 119/53.5 |
| 5,555,843 A * | 9/1996 | Harmon | A01K 5/0233 | 119/57.8 |
| 5,603,285 A * | 2/1997 | Kleinsasser | A01K 5/0225 | 119/53 |
| 6,082,300 A * | 7/2000 | Futch | A01K 5/0225 | 119/51.11 |
| 9,974,285 B2 * | 5/2018 | Kunnumpurath | A01K 5/0233 | |
| 2002/0033141 A1 * | 3/2002 | Rovira Badia | A01K 5/0225 | 119/51.5 |
| 2002/0088404 A1 * | 7/2002 | Romeu | A01K 5/0275 | 119/56.1 |
| 2003/0145796 A1 * | 8/2003 | Rasmussen | A01K 5/0225 | 119/53.5 |
| 2005/0132967 A1 * | 6/2005 | Kleinsasser | A01K 5/0225 | 119/53 |
| 2005/0229860 A1 * | 10/2005 | Meritt | A01K 5/0225 | 119/53 |
| 2005/0281648 A1 * | 12/2005 | Hockenyos | A01K 5/0225 | 414/462 |
| 2005/0284384 A1 * | 12/2005 | Arsenault | A01K 5/0225 | 119/52.1 |
| 2006/0185603 A1 * | 8/2006 | Rosener | A01K 5/02 | 119/51.02 |
| 2008/0134980 A1 * | 6/2008 | Bondarenko | A01K 5/0241 | 119/53 |
| 2008/0271815 A1 * | 11/2008 | Guardia | A01K 5/0225 | 141/344 |
| 2009/0320762 A1 * | 12/2009 | Chang | A01K 5/0233 | 119/53 |
| 2010/0180825 A1 * | 7/2010 | Kleinsasser | A01K 5/0225 | 119/53 |
| 2011/0239947 A1 * | 10/2011 | Chang | A01K 5/0225 | 119/52.1 |
| 2012/0042831 A1 * | 2/2012 | Holloway | A01K 5/0225 | 119/51.11 |
| 2012/0234248 A1 * | 9/2012 | Lytle | A01K 5/0233 | 119/54 |
| 2013/0098299 A1 * | 4/2013 | Adermann | F16H 21/16 | 119/53 |
| 2013/0180456 A1 * | 7/2013 | Whitsett | A01K 5/02 | 119/57.92 |
| 2014/0130746 A1 * | 5/2014 | Kleinsasser | A01K 5/0225 | 119/51.5 |
| 2014/0197206 A1 * | 7/2014 | Jansen | A01K 39/012 | 222/185.1 |
| 2015/0083048 A1 * | 3/2015 | McAdams | A01K 5/0225 | 119/51.5 |
| 2015/0313179 A1 * | 11/2015 | Green | A01K 5/0291 | 119/51.11 |
| 2017/0000083 A1 * | 1/2017 | McAdams | A01K 5/0225 | |
| 2018/0049403 A1 * | 2/2018 | McAdams | A01K 5/0275 | |
| 2018/0049405 A1 * | 2/2018 | McAdams | A01K 5/0275 | |
| 2019/0239473 A1 * | 8/2019 | Brehmer | A01K 5/025 | |
| 2019/0364846 A1 * | 12/2019 | Kleinsasser | F16H 25/20 | |

* cited by examiner

SELF-FEEDER FOR SOWS

CROSS-REFERENCE TO RELATED APPLICATION

This application is a 371 application of International PCT application serial no. PCT/CN2017/074188, filed on Feb. 21, 2017, which claims the priority benefit of China application no. 201611092573.7, filed on Dec. 2, 2016. The entirety of each of the above-mentioned patent applications is hereby incorporated by reference herein and made a part of this specification.

BACKGROUND OF THE INVENTION

1. Field of the Invention

The present invention relates to the technical field of animal husbandry equipment, and in particular, to a self-feeder for sows.

2. Description of Related Art

There are several types of sow feeders. The most commonly used sow feeders at present are open-type multiple-discharge feeders and ordinary self-feeders that are fixed on a feed line or an obstetric table. In spite of their high universality, such feeders have the following disadvantages: 1. if fodder is loaded in a trough, a sow cannot get fresh fodder with the lapse of time; 2. if too much fodder is added, the sow may easily pull the fodder out, resulting in a waste of the fodder; 3. as the fodder needs to be added multiple times a day to meet the need of the sow, problems that the feeders are labor-consuming and the like are caused; 4. the ordinary self-feeders discharge fodder from the middle, and the fodder may fall on the eyes and snout of the sow, which interferes with feeding of the sow and affects its respiratory health.

SUMMARY OF THE INVENTION

To solve the above technical problem, the present invention provides a self-feeder for sows, which can automatically discharge fodder on a feed line to reduce manual work; can adjust the feed volume freely and discharge fodder while a sow is eating, to avoid wasting the fodder; and can avoid fodder falling on the eyes and snout of the sow during discharging.

The present invention adopts the following technical solution. A self-feeder for sows comprises a hopper with a top opening, a feed volume adjusting mechanism, and a discharge mechanism. The feed volume adjusting mechanism is mounted in the hopper. The hopper comprises a C-shaped housing, a front side plate, a bottom plate, and a guide plate. The front side plate is fixed on the front side of the C-shaped housing. The bottom plate is welded on the bottom of the C-shaped housing. A gap is disposed between the bottom plate and the front side plate and used as a discharge port. The guide plate is welded between the bottom plate and a rear wall of the C-shaped housing and is aligned with the bottom plate at the discharge port. The discharge mechanism comprises a discharge plate, a push rod, a top cap, and a stop pin. The discharge plate is located above the guide plate. The top cap is located below the bottom plate. An upper end of the push rod passes through the bottom plate and the guide plate and is welded to the discharge plate. A bottom end of the push rod is welded with the top cap. The stop pin is welded on the push rod below the bottom plate. The discharge plate cooperates with the feed volume adjusting mechanism to control the feed volume.

The feed volume adjusting mechanism comprises a pointer, a pull rod, and an adjustable tilting plate. An upper end of the pull rod is movably connected to the pointer, and a lower end of the pull rod is movably connected to the adjustable tilting plate. The adjustable tilting plate is located obliquely above the guide plate, and the adjustable tilting plate and the guide plate form a y-shaped funnel. The pointer is fixed on an upper portion of the front side plate through pointer mounting holes. The pull rod is fixed on a lower portion of the front side plate through a fixing buckle.

A square tube is welded between the bottom plate and the guide plate and extends to a position above the guide plate. A reinforcing block is provided at the bottom of the discharge plate. An upper end of the push rod passes through the square tube and the reinforcing block and is welded to the discharge plate to prevent rotation.

The present invention has the following beneficial effects. The self-feeder has a simple structure; the feed volume can be adjusted freely, and the fodder can be discharged avoiding falling on the eyes and snout of a sow, such that the feeder is convenient to use; the manual discharging times is reduced; the sow can eat fresh fodder and the fodder may not get out; therefore, the fodder is not wasted and the manpower is saved.

Figure 1:
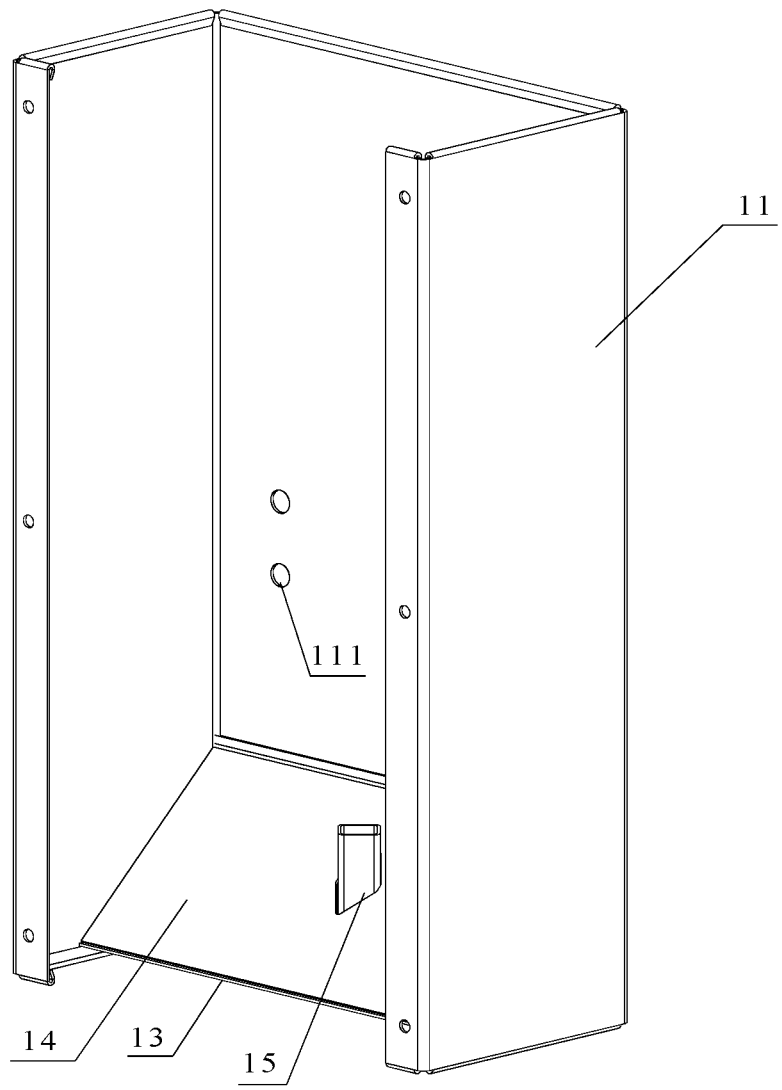
FIG. 1 is a schematic structural diagram of a hopper of the present invention (without a font side plate).
Figure 2:
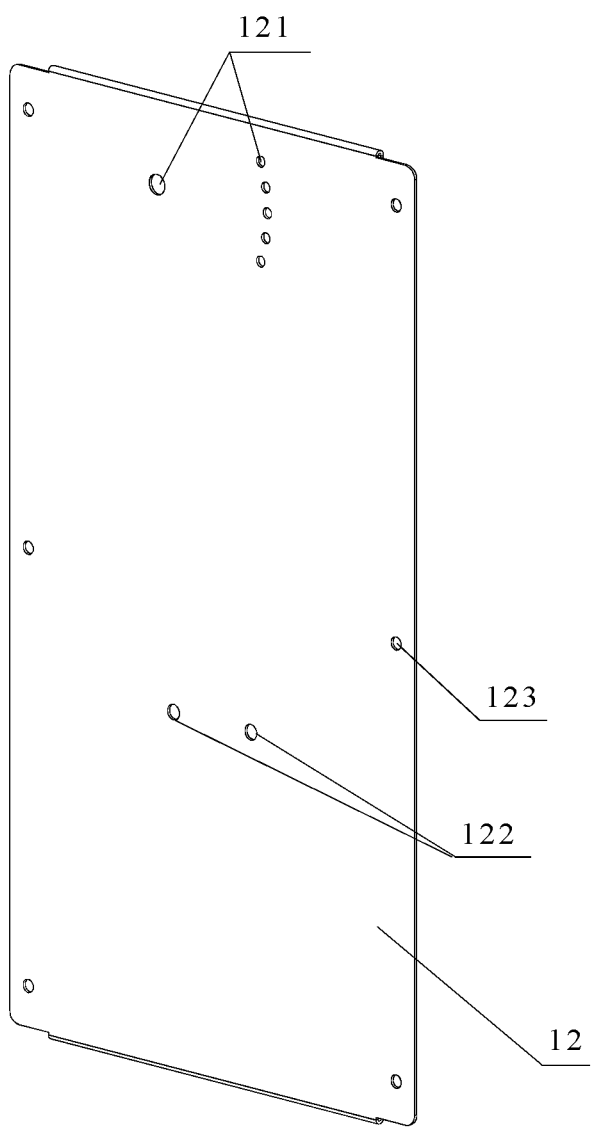
FIG. 2 is a schematic structural diagram of a front side plate of the present invention.

In the drawings, 1. hopper, 11. C-shaped housing, 111. U-bolt mounting hole, 12. front side plate, 121. pointer mounting hole, 122. fixing buckle mounting hole, 123. front side plate mounting hole, 13. bottom plate, 14. guide plate, 15. square tube, 2. feed volume adjusting mechanism, 21. pointer, 22. pull rod, 23. adjustable tilting plate, 24. fixing buckle, 3. discharge mechanism, 31. discharge plate, 32. push rod, 33. top cap, 34. stop pin, 35. reinforcing block.

DESCRIPTION OF THE EMBODIMENTS

To better understand the present invention, the present invention is further described in detail below by reference to the embodiments and the accompanying drawings. The embodiments are only intended to explain the present invention instead of limiting the protection scope of the present invention.

Figure 3:
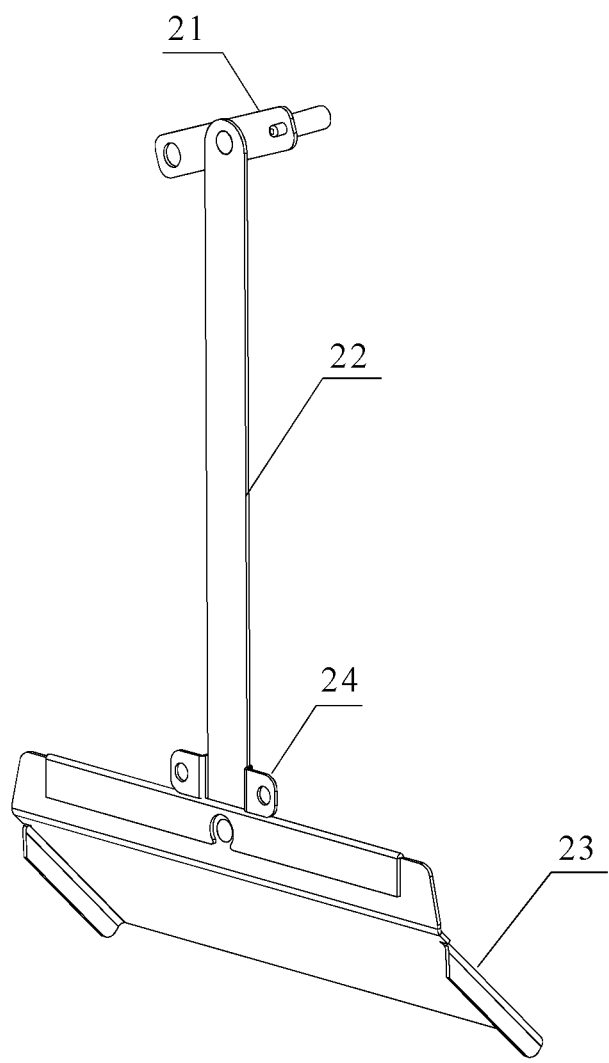
FIG. 3 is a schematic structural diagram of a feed volume adjusting mechanism of the present invention.
Figure 4:
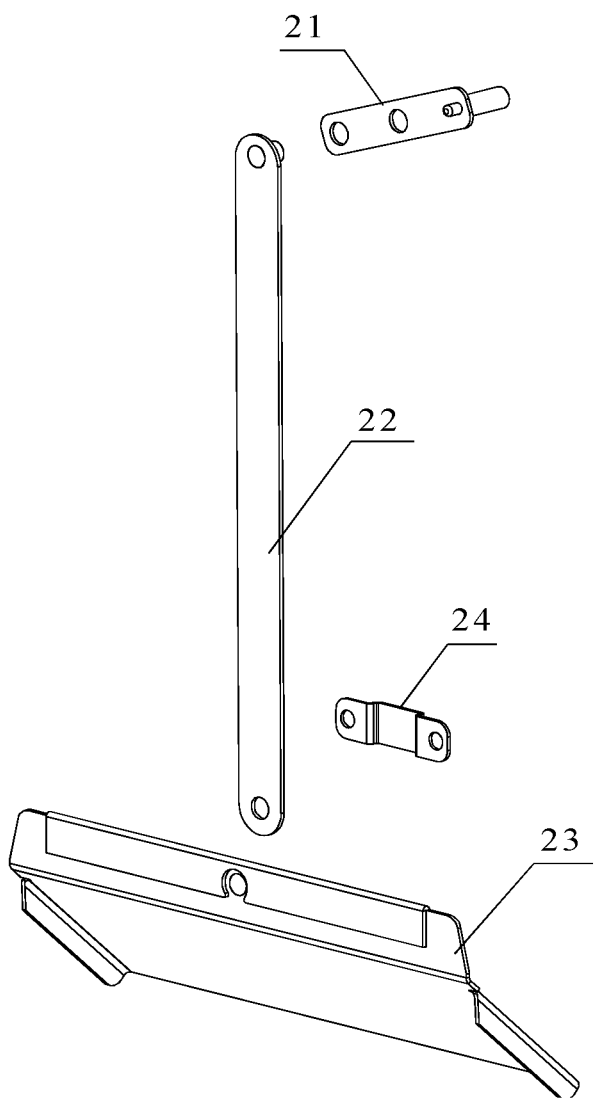
FIG. 4 is an exploded diagram of FIG. 3.
Figure 5:
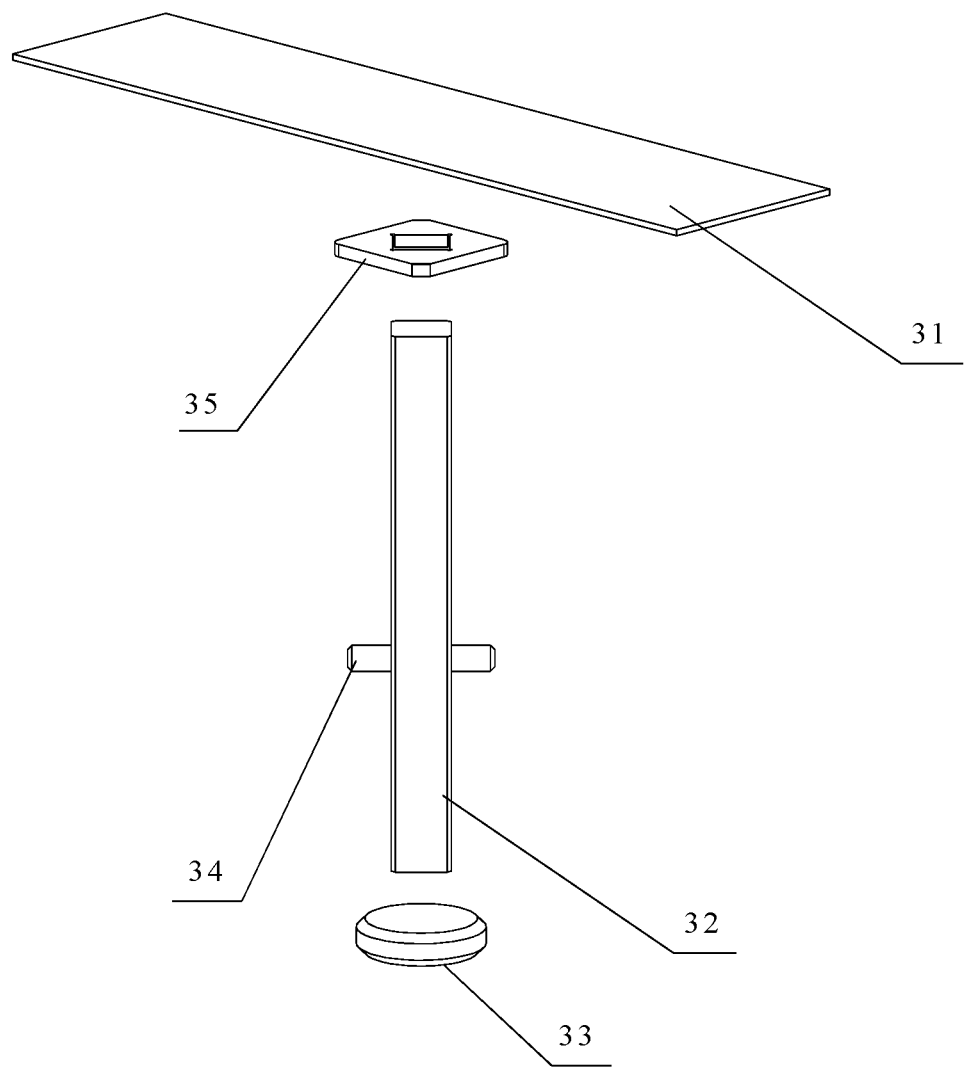
FIG. 5 is a schematic structural diagram of a discharge mechanism of the present invention.
Figure 6:
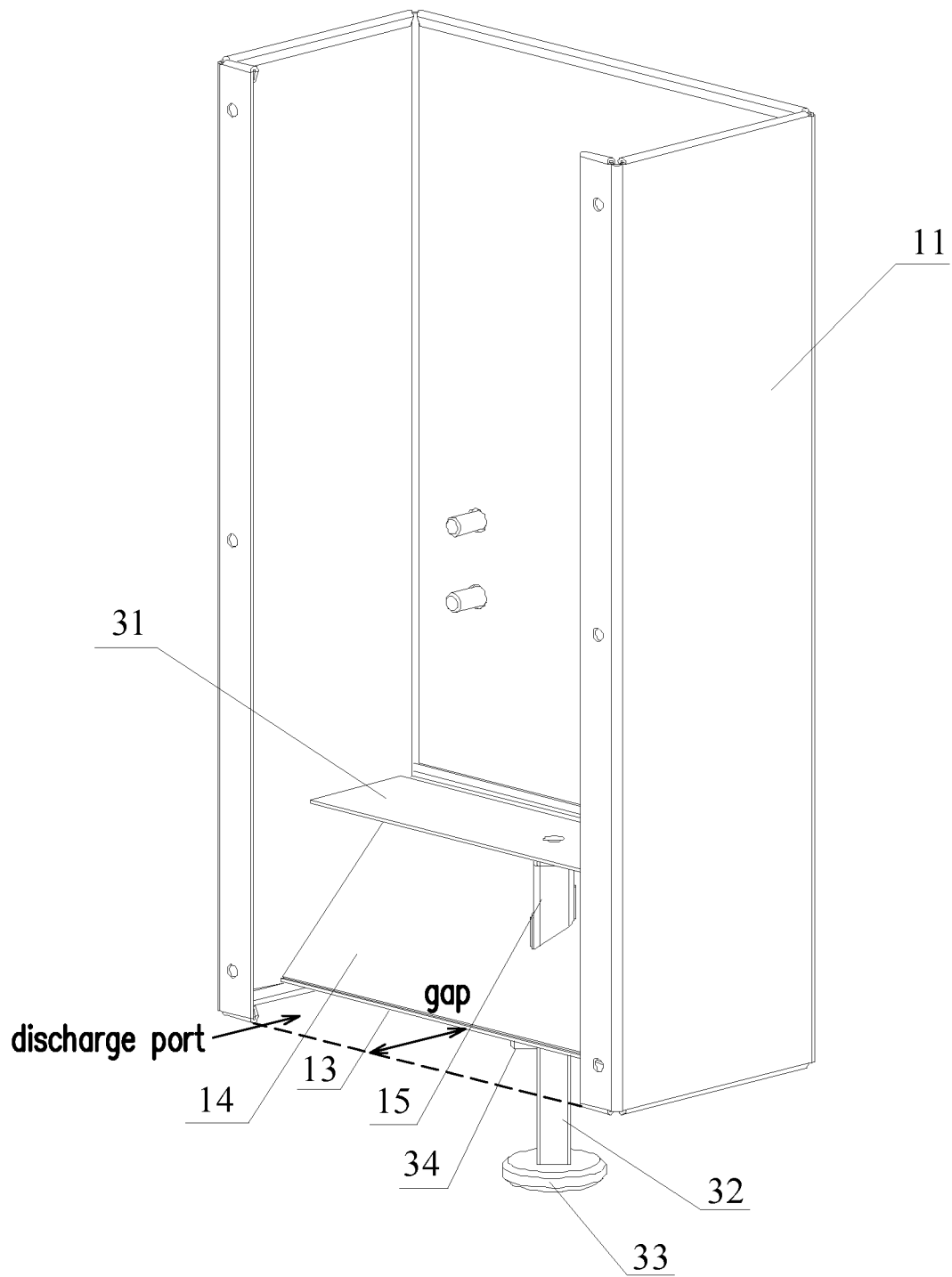
FIG. 6 is a schematic structural diagram illustrating cooperation of the hopper and the discharge mechanism of the present invention (without the front side plate).
Figure 7:
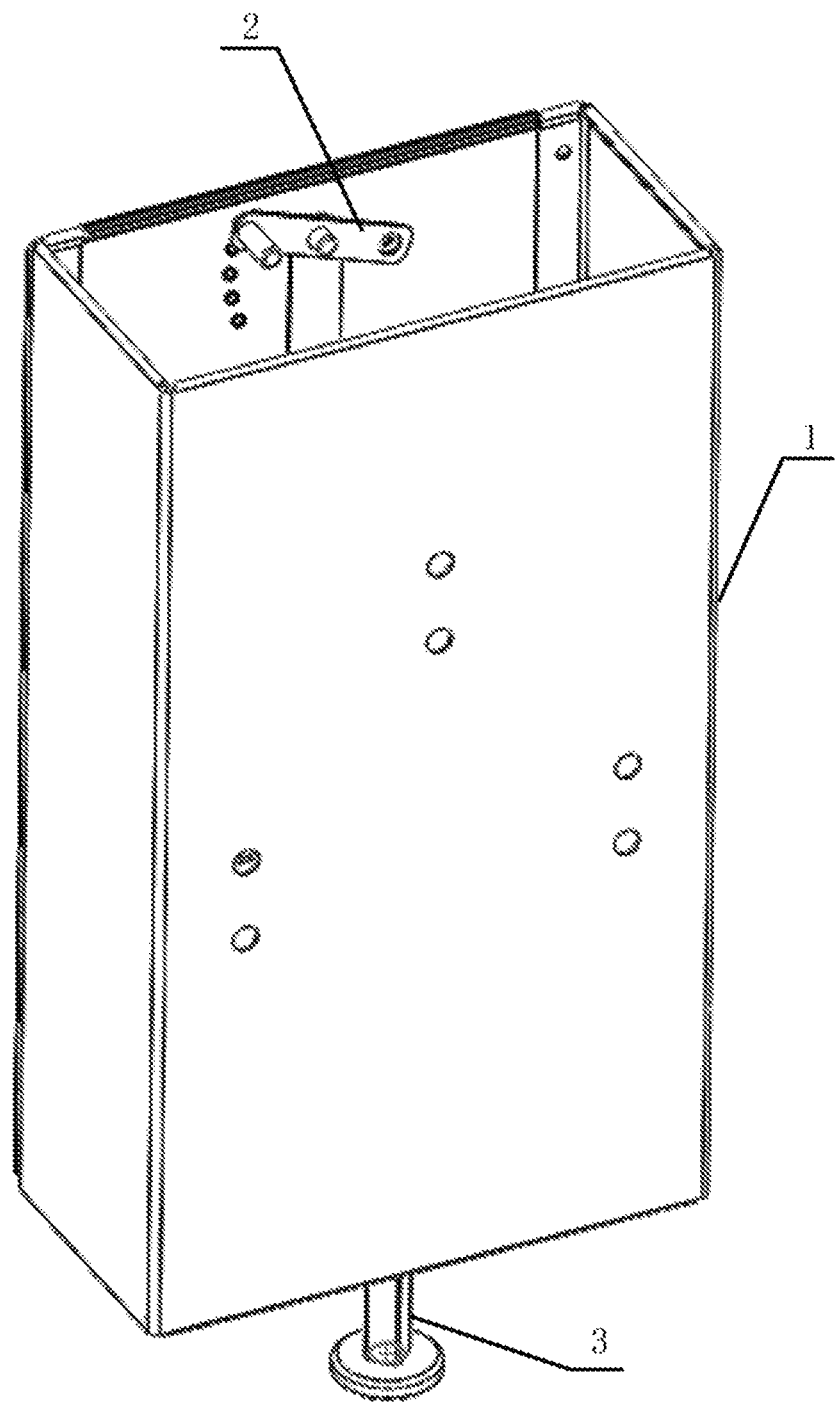
FIG. 7 is a three-dimensional diagram of the present invention.
Figure 8:
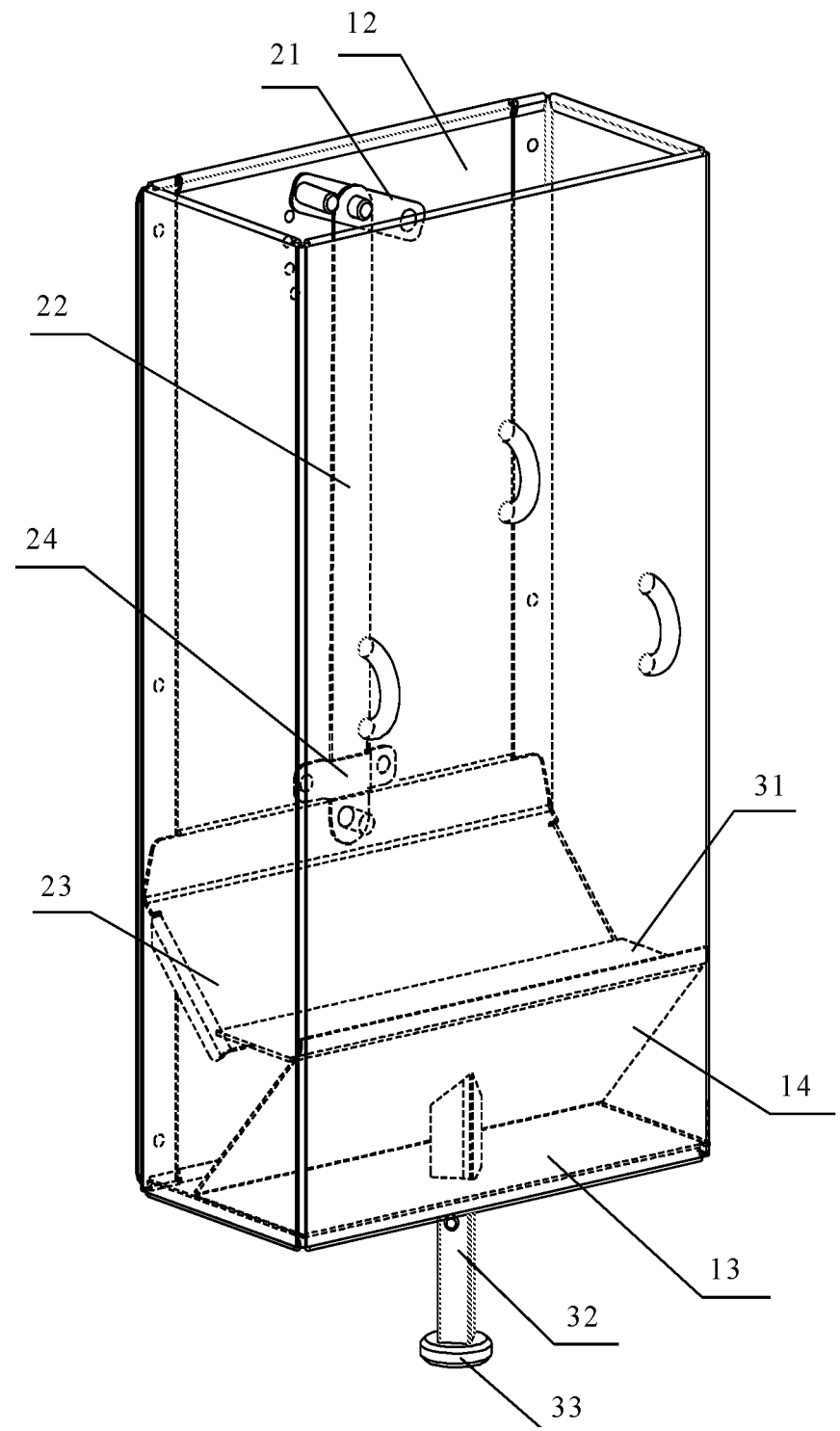
FIG. 8 is a perspective diagram of the present invention.

As shown in FIG. 1 to FIG. 8, a self-feeder for sows comprises a hopper 1 with a top opening, a feed volume adjusting mechanism 2, and a discharge mechanism 3. The feed volume adjusting mechanism 2 is mounted in the hopper 1. The hopper 1 comprises a C-shaped housing 11, a front side plate 12, a bottom plate 13, and a guide plate 14. The front side plate 12 is fixed on the front side of the C-shaped housing 11 through front side plate mounting holes 123. The bottom plate 13 is welded on the bottom of the C-shaped housing. A gap is disposed between the bottom plate 13 and the front side plate 12 and used as a discharge port. The guide plate 14 is welded between the bottom plate 13 and a rear wall of the C-shaped housing and is aligned with the bottom plate 13 at the discharge port. A square tube 15 is welded between the bottom plate 13 and the guide plate 14 and extends to a position above the guide plate. The whole hopper is mounted on a door through U-bolt mounting holes 111 at the back of the C-shaped housing. It is convenient to insert and mount a feed-line tube freely through the top opening of the hopper. As shown in FIG. 5, the discharge mechanism 3 comprises a discharge plate 31, a push rod 32, a top cap 33, a stop pin 34, and a reinforcing block 35. The reinforcing block 35 is located at the bottom of the discharge plate. The discharge plate 31 is located above the guide plate 14. The top cap 33 is located below the bottom plate 13. An upper end of the push rod 32 passes through the square tube 15 and the reinforcing block 35 and is welded to the discharge plate 31 to prevent rotation. A bottom end of the push rod 32 is welded with the top cap 33. The stop pin 34 is welded on the push rod 32 below the bottom plate. A certain distance is kept between the stop pin 32 and the square tube 15 such that a sow can push the top cap up and down freely.

As shown in FIG. 3 and FIG. 4, the feed volume adjusting mechanism 2 comprises a pointer 21, a pull rod 22, and an adjustable tilting plate 23. An upper end of the pull rod 22 is movably connected to a middle portion of the pointer 21, and a lower end of the pull rod 22 is movably connected to the adjustable tilting plate 23. The adjustable tilting plate 23 is located obliquely above the guide plate 14, and the adjustable tilting plate and the guide plate form a y-shaped funnel. The pointer 21 is fixed on an upper portion of the front side plate 12 through pointer mounting holes 121 (including a separate fixing hole and five adjustable fixing holes in arc-shaped arrangement). One end of the pointer 21 is fixed to the separate fixing hole, and the other end of the pointer 21 is fixed to the adjustable fixing hole. Fixing buckle mounting holes 122 are formed at a lower portion of the front side plate 12. The pull rod 22 is fixed by using a fixing buckle 24 which is fixed to the fixing buckle mounting holes 122. By changing the mounting position of the end of the pointer at the five adjustable fixing holes, the adjustable tilting plate 23 is closely attached to the side wall of the C-shaped housing and slides up and down to adjust and control the feed volume.

The working principle of the present invention is as follows. Fodder is loaded from above the hopper, and the feed volume is adjusted by changing the fixed position of the end of the pointer at the adjustable fixing holes, where the feed volume is the lowest when the pointer is at the adjustable fixing hole on the top, and the feed volume gradually increases when the pointer is adjusted downward. After the feed volume is adjusted, due to gravity of the discharge mechanism, the edge of the discharge plate contacts the adjustable tilting plate to hold the fodder. The self-feeder for sows is mounted above a trough. A sow pushes the top cap upward by its snout when eating, such that the push rod moves upward and forces the discharge plate to move upward. A gap appears between the adjustable tilting plate and the guide plate. The fodder falls from the gap, slides down along the guide plate, and is guided to the front discharge port for discharging. Therefore, the fodder does not fall on the eyes and snout of the sow; and as the sow pushes to get the fodder whenever needed and the feed volume depends on the need of the sow, the sow can feed freely and get fresh fodder without wasting it.

What is claimed is:

1. A self-feeder for sows, comprising a hopper with a top opening, a feed volume adjusting mechanism, and a discharge mechanism, wherein the feed volume adjusting mechanism is mounted in the hopper; the hopper comprises a C-shaped housing, a front side plate, a bottom plate, and a guide plate; the front side plate is fixed on the front side of the C-shaped housing; the bottom plate is welded on a bottom of the C-shaped housing; a gap is disposed between the bottom plate and the front side plate and used as a discharge port; the guide plate is welded between the bottom plate and a rear wall of the C-shaped housing and is aligned with the bottom plate at the discharge port; the discharge mechanism comprises a discharge plate, a push rod, a top cap, and a stop pin; the discharge plate is located above the guide plate, the top cap is located below the bottom plate, an upper end of the push rod passes through the bottom plate and the guide plate and is welded to the discharge plate, a bottom end of the push rod is welded with the top cap, and the stop pin is welded on the push rod below the bottom plate; and the discharge plate cooperates with the feed volume adjusting mechanism to control a feed volume.

2. The self-feeder for sows according to claim 1, wherein the feed volume adjusting mechanism comprises a pointer, a pull rod, and an adjustable tilting plate; an upper end of the pull rod is movably connected to the pointer, a lower end of the pull rod is movably connected to the adjustable tilting plate, the adjustable tilting plate is located obliquely above the guide plate, and the adjustable tilting plate and the guide plate form a y-shaped funnel, the pointer is fixed on an upper portion of the front side plate through pointer mounting holes, and the pull rod is fixed on a lower portion of the front side plate through a fixing buckle.

3. The self-feeder for sows according to claim 1, wherein a square tube is welded between the bottom plate and the guide plate and extends to a position above the guide plate, a reinforcing block is provided at a bottom of the discharge plate, and an upper end of the push rod passes through the square tube and the reinforcing block and is welded to the discharge plate.

* * * * *